US012725854B2

(12) United States Patent
Miller et al.

(10) Patent No.: US 12,725,854 B2
(45) Date of Patent: Sep. 1, 2026

(54) COOLANT MANIFOLD RETENTION CLIP

(71) Applicant: GM GLOBAL TECHNOLOGY OPERATIONS LLC, Detroit, MI (US)

(72) Inventors: Cody Miller, Royal Oak, MI (US); Lawrence X. Lanier, Farmington Hills, MI (US); Timothy J. Reinhart, Lake Orion, MI (US)

(73) Assignee: GM Global Technology Operations LLC, Detroit, MI (US)

(*) Notice: Subject to any disclaimer, the term of this patent is extended or adjusted under 35 U.S.C. 154(b) by 729 days.

(21) Appl. No.: 18/160,790

(22) Filed: Jan. 27, 2023

(65) Prior Publication Data

US 2024/0258611 A1 Aug. 1, 2024

(51) Int. Cl.

| | |
|---|---|
| ***H01M 10/6568*** | (2014.01) |
| ***B60H 1/00*** | (2006.01) |
| ***H01M 10/613*** | (2014.01) |
| ***H01M 10/625*** | (2014.01) |

(52) U.S. Cl.

CPC ..... *H01M 10/6568* (2015.04); *H01M 10/613* (2015.04); *H01M 10/625* (2015.04); *B60H 1/00278* (2013.01); *H01M 2220/20* (2013.01)

(58) Field of Classification Search

CPC ........... H01M 10/6568; H01M 10/613; H01M 2220/20; H01M 10/625; B60H 1/00278

See application file for complete search history.

(56) References Cited

U.S. PATENT DOCUMENTS

| | | | | |
|---|---|---|---|---|
| 10,756,498 | B1 * | 8/2020 | Sarraf | H01M 50/50 |
| 2013/0164593 | A1 * | 6/2013 | Burrows | B60K 1/04 429/120 |
| 2018/0062347 | A1 * | 3/2018 | Hodges | F28D 1/0435 |
| 2018/0277808 | A1 * | 9/2018 | Kruszelnicki | H01M 10/6568 |
| 2019/0109355 | A1 | 4/2019 | Jones et al. | |
| 2023/0307768 | A1 * | 9/2023 | Chang | H01M 50/264 |

FOREIGN PATENT DOCUMENTS

| | | | |
|---|---|---|---|
| DE | 10238235 | A1 | 3/2004 |
| DE | 102004005394 | A1 | 8/2005 |
| DE | 102020101259 | B4 | 8/2023 |

* cited by examiner

*Primary Examiner* — Nicholas A Smith
*Assistant Examiner* — Benjamin Eli Kass-Mullet
(74) *Attorney, Agent, or Firm* — Quinn IP Law

(57) ABSTRACT

A retention clip is employed in a cooling subsystem of an electric energy generation and storage system having a battery cell. The cooling subsystem includes a coolant header extending proximate the battery cell and having an inlet fitting and an outlet fitting. The cooling subsystem also includes an inlet manifold configured to connect with the inlet fitting and an outlet manifold configured to connect with the outlet fitting. The inlet and outlet manifolds are together configured to circulate coolant through the coolant header. The retention clip is configured to engage and hold each of the inlet manifold and the outlet manifold and snap onto the coolant header to thereby fix the inlet manifold relative to the outlet manifold and fix and seal the inlet manifold and the outlet manifold to the coolant header.

14 Claims, 4 Drawing Sheets

40-1, 40-2, 40-3, 40-4, 40-5
38
$t_l$
56-1
60
58
46-1, 46-2, 46-3, 46-4, 46-5
54-1
72
66-1
50
64
70
44-1, 44-2, 44-3, 44-4, 44-5
62
68
70
52
66
$t_b$
48
56-2
60
58
54-2
66-2

COOLANT MANIFOLD RETENTION CLIP

INTRODUCTION

The present disclosure relates to a retention clip for securing coolant manifold(s) to a coolant header in an electric energy generation and storage battery system.

Typically, an electric energy generation and storage battery system includes one or more battery cells for powering a load. A plurality of battery cells may be arranged in close proximity to one another to generate a battery module or array. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental, and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Exposure of a battery cell to elevated temperatures over prolonged periods may cause the cell to experience a thermal runaway event, where heat build-up in individual cell leads to the heat spreading to adjacent cells in the module and affecting the entire battery array. Accordingly, thermal energy needs to be effectively removed to mitigate heat build-up and consequent degradation of battery system performance. Generally, devices such as heat-sinks or cold-plates with circulating coolant are employed to remove heat from battery systems.

SUMMARY

A retention clip is employed in a cooling subsystem of an electric energy generation and storage system having a battery cell. The cooling subsystem includes a coolant header extending proximate the battery cell and having an inlet fitting and an outlet fitting. The cooling subsystem also includes an inlet manifold configured to connect with the inlet fitting and an outlet manifold configured to connect with the outlet fitting. The inlet and outlet manifolds are together configured to circulate coolant through the coolant header. The retention clip is configured to engage and hold each of the inlet manifold and the outlet manifold and snap onto the coolant header to thereby fix the inlet manifold relative to the outlet manifold and fix and seal the inlet manifold and the outlet manifold to the coolant header.

The retention clip may include a first snap-fit leg and a second snap-fit leg and a clip body connected to each of the first and second snap-fit legs. The first snap-fit leg may be configured to engage and lock onto the inlet fitting and the second snap-fit leg may be configured to engage and lock onto the outlet fitting.

Each of the coolant inlet and coolant outlet fittings may include a tab projecting away from the corresponding fitting. Each of the first and the second snap-fit legs may define an opening configured to engage one tab of the inlet and outlet fittings.

At least one of the inlet manifold and the outlet manifold is defined by an outer surface having a circular shape in a cross-sectional view of the respective manifold. In a side view, the clip body may include an inner surface having at least one section characterized by a concave shape. The section of the clip body inner surface having the concave shape may be configured to engage and match the outer surface of the at least one of the inlet manifold and outlet manifold when the retention clip is snapped onto the coolant header.

The clip body may include an outer surface having at least one press-pad configured to be engaged by an assembly device for snaping the retention clip onto the coolant header.

In the side view of the retention clip, each press-pad may be arranged across from one of the clip body sections characterized by the concave shape.

The retention clip may include an anti-rotation feature configured to extend between the coolant inlet conduit and a coolant outlet conduit.

The retention clip may be constructed from a polymeric material.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
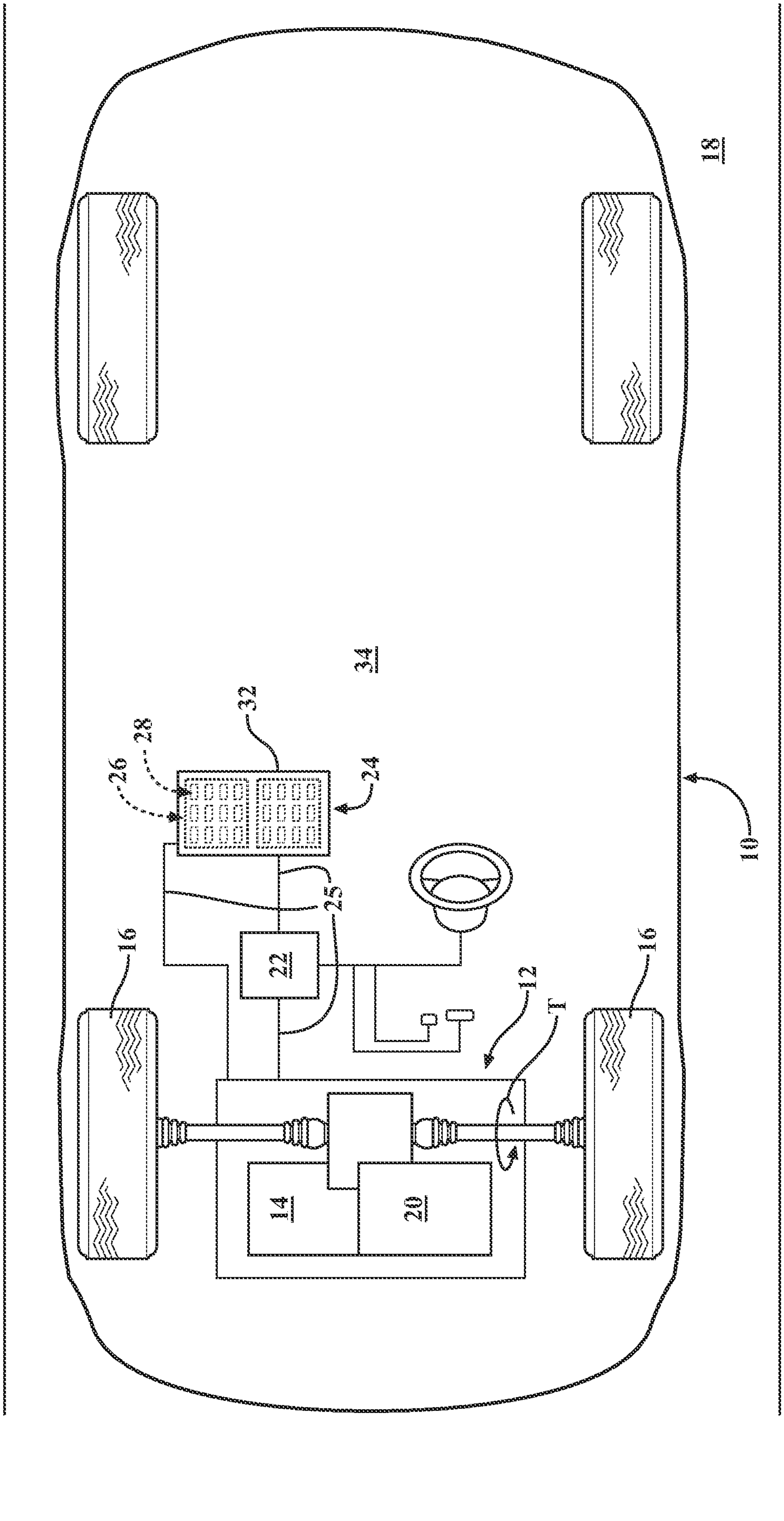
FIG. 1 is a schematic top view of an embodiment of a motor vehicle employing multiple power-sources and a battery system having a plurality of battery cells configured to generate and store electrical energy used by vehicle systems including the power-sources, according to the disclosure.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a battery system 24 configured to generate and store electrical energy through heat-producing electro-chemical reactions for supplying the electrical energy to the power-sources 14 and 20. The electronic controller 22 may be a central processing unit (CPU) that regulates various functions on the vehicle 10, or as a powertrain control module (PCM) configured to control the powertrain 12 to generate a predetermined amount of power-source torque T. The battery system 24 may be connected to the power-sources 14 and 20, the electronic controller 22, as well as other vehicle systems via a high-voltage BUS 25.

Figure 3:
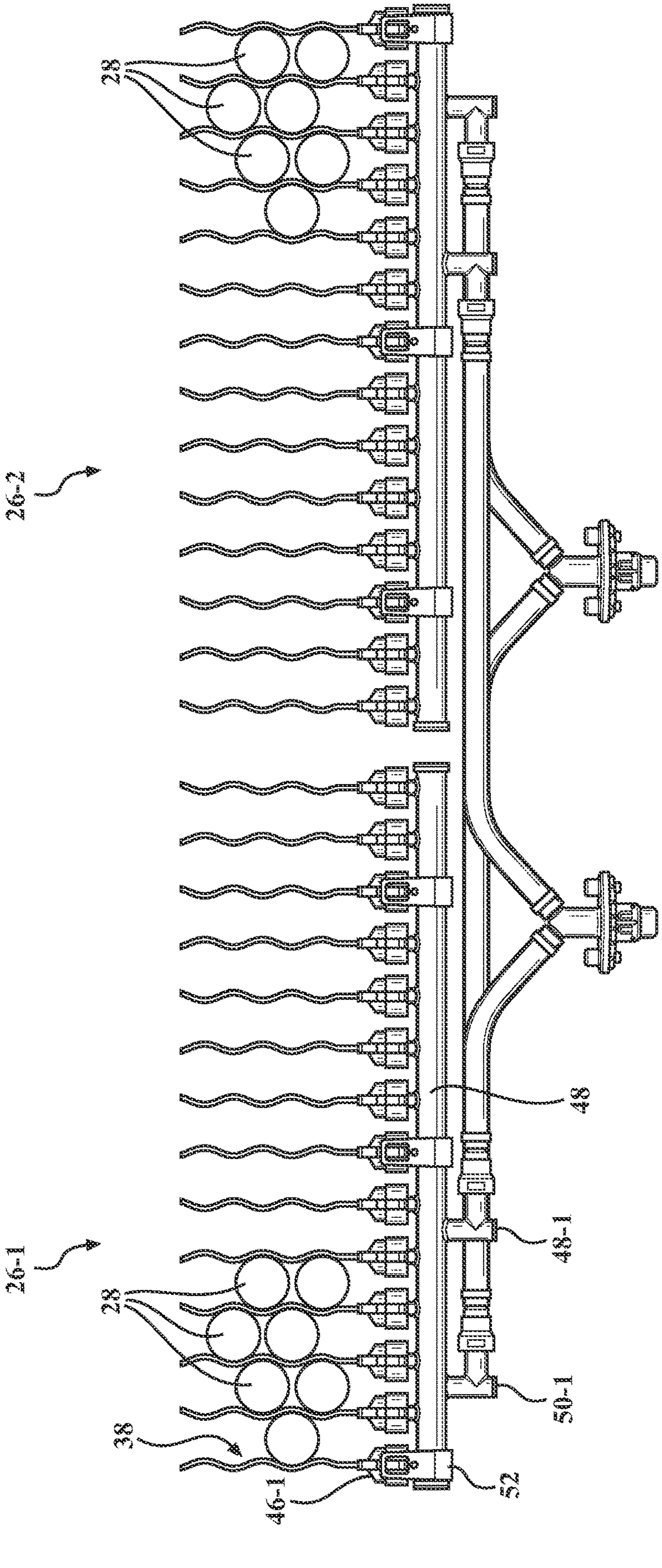
FIG. 3 is a schematic top view of the battery system including the cooling subsystem shown in FIG. 2.

The battery system 24 includes a plurality of battery cells 28, which may be subdivided into battery groups or modules 26. As shown in FIG. 3, the battery cells 28 in a module 26-1 and module 26-2 of the battery system 24 are arranged in individual rows, specifically including battery cells in a first row 30-1, a neighboring, directly adjacent, second row 30-2, as well as third and fourth rows 30-3 and 30-4. As shown, each battery cell 28 in rows 30-1, 30-2, 30-3, 30-4 may be configured as a cylindrical cell, extending generally upward in an X-Y plane. Although two modules, 26-1 and 26-2, with four rows 30-1, 30-2, 30-3, 30-4 of battery cells 28 in each module are shown, nothing precludes the battery system 24 from having a greater or fewer number of such modules and rows. The remainder of the present description will focus on module construction having four rows 30-1, 30-2, 30-3, 30-4 of battery cells 28, which may be adapted to a specific battery module having a desired overall quantity of cells. As shown in FIG. 1, the battery system 24 also includes a battery module enclosure 32 surrounded by an ambient environment 34. The battery module enclosure 32 is configured to house each of the rows of battery cells 30-1, 30-2, 30-3, 30-4.

Figure 2:
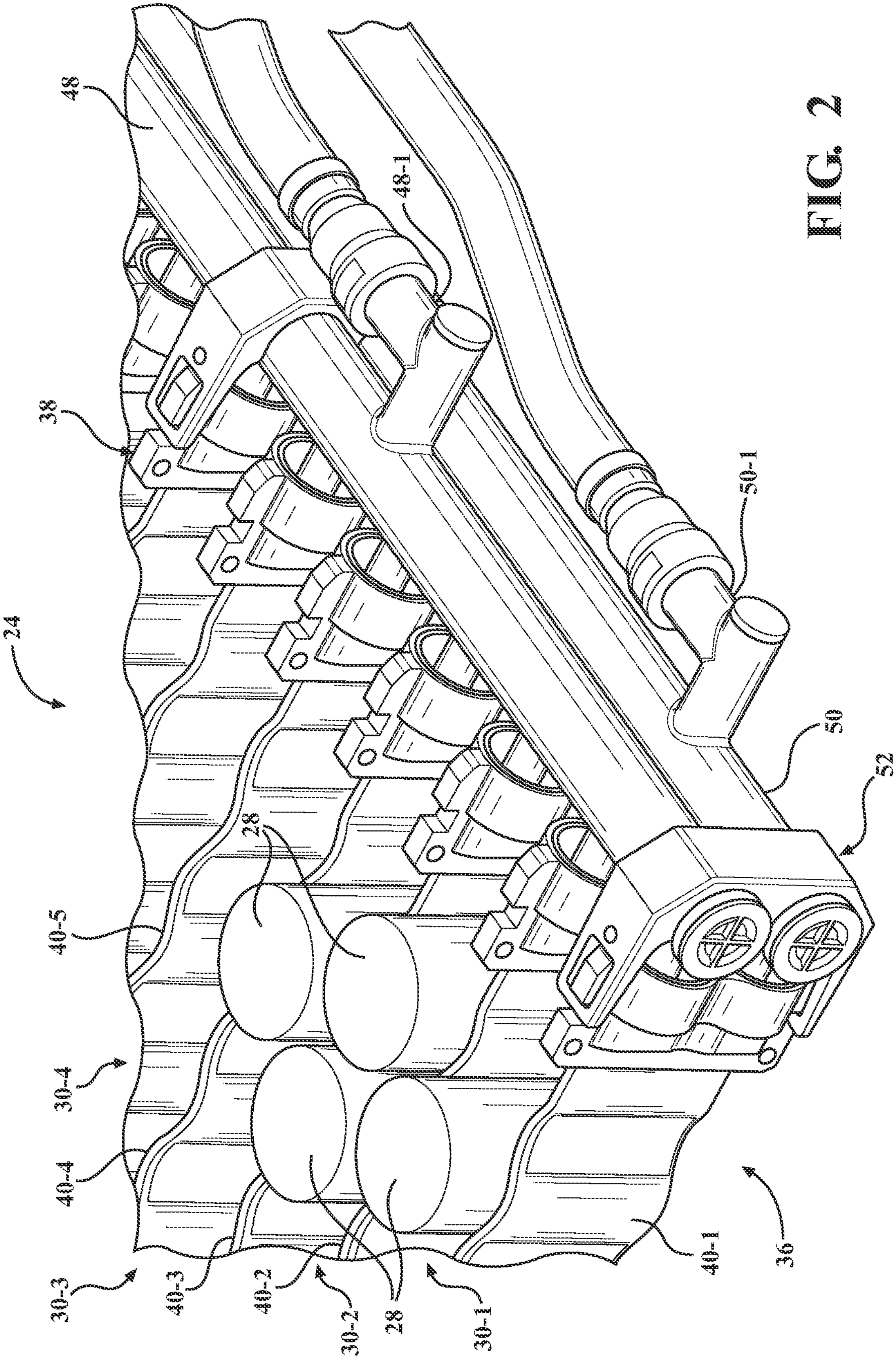
FIG. 2 is a schematic perspective view of the battery system shown in FIG. 1, having a plurality of battery cells organized in rows and a cooling subsystem for removing thermal energy from the battery cells, further illustrating the cooling system including a coolant header with inlet and outlet fittings secured to coolant inlet and outlet manifolds by retention clips, according to the disclosure.

As shown in FIG. 2, the battery system 24 also includes a cooling subsystem 36 configured to remove thermal energy from the battery cells 28. The cooling subsystem 36 includes a coolant header 38 operating as a heat sink for the battery cells 28 in rows 30-1, 30-2, 30-3, 30-4. The coolant header 38 includes individual coolant passages, such as passages 40-1, 40-2, 40-3, 40-4, and 40-5 shown in FIG. 2, extending proximate the battery cells 28 in rows 30-1, 30-2, 30-3, and 30-4. The passages 40-1, 40-2, 40-3, 40-4, and 40-5 are configured to circulate a coolant 42 through the coolant header 38. Each pair of passages, such as passages 40-1 and 40-2, passages 40-2 and 40-3, passages 40-3 and 40-4, and passages 40-4 and 40-5, is intended to be in contact with and sandwich one corresponding row 30-1, 30-2, 30-3, 30-4 and thereby configured to absorb and remove thermal energy therefrom.

The passages 40-1, 40-2, 40-3, 40-4, and 40-5 of the coolant header 38 may have a wave-like ribbon shape as shown in a perspective view in FIG. 2 and in a top view in FIG. 3. Such ribbon shape of adjacent passages 40-1, 40-2, 40-3, 40-4, and 40-5 is configured to embrace individual battery cells 28. As a result, the ribbon-shaped passages 40-1, 40-2, 40-3, 40-4, and 40-5 may be configured to seat the battery cells 28 in individually sandwiched rows and maintain position thereof. The coolant header 38 also includes inlet fittings 44-1, 44-2, 44-3, 44-4, and 44-5 and outlet fittings 46-1, 46-2, 46-3, 46-4, and 46-5. Each of the inlet fittings 44-1, 44-2, 44-3, 44-4, and 44-5 and outlet fittings 46-1, 46-2, 46-3, 46-4, and 46-5 is fluidly connected to the corresponding coolant passages 40-1, 40-2, 40-3, 40-4, and 40-5.

The cooling subsystem 36 also includes an inlet manifold 48 configured to connect with the inlet fittings 44-1, 44-2, 44-3, 44-4, and 44-5. Additionally, the battery system 24 includes an outlet manifold 50 configured to connect with the outlet fittings 46-1, 46-2, 46-3, 46-4, and 46-5. Together, the inlet and outlet manifolds 48, 50 are configured to circulate the coolant 42 through the coolant header 38. As shown in FIG. 2, each of the inlet and outlet manifolds 48, 50 may be positioned substantially transverse to the individual coolant passages 40-1, 40-2, 40-3, 40-4, and 40-5. Each of the inlet and outlet manifolds 48, 50 may have a respective fluid connection 48-1, 50-1 to an external source of the coolant 42, such as a fluid pump (not shown).

The cooling subsystem 36 additionally includes a retention clip 52 configured to engage and hold or maintain each of the inlet manifold 48 and the outlet manifold 50 in position relative to the coolant header 38. Specifically, the retention clip 52 is configured to snap onto the coolant header 38 and thereby simultaneously fix the inlet manifold 48 relative to the outlet manifold 50 and fix and seal both, the inlet manifold and the outlet manifold, to the coolant header As shown in FIGS. 4 and 5, the retention clip 52 may include a first snap-fit leg 54-1 configured to engage and lock onto one of the inlet fittings 44-1, 44-2, 44-3, 44-4, and 44-5, for example, the inlet fitting 44-1 corresponding to the coolant passage 40-1.

Figure 4:
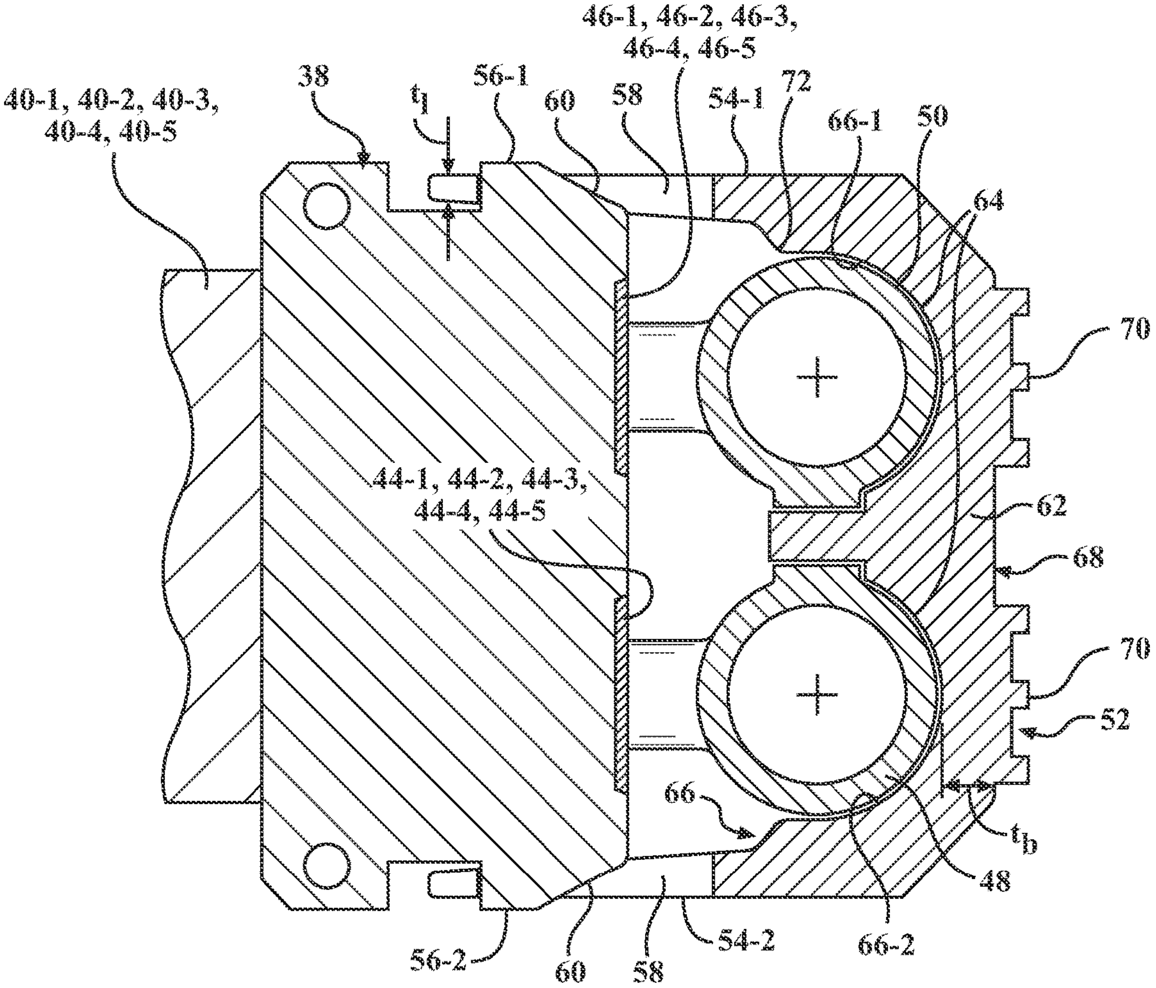
FIG. 4 is a schematic side view of one retention clip snapped onto the coolant header inlet and outlet fittings to secure the inlet and outlet manifolds to the coolant header.
Figure 5:
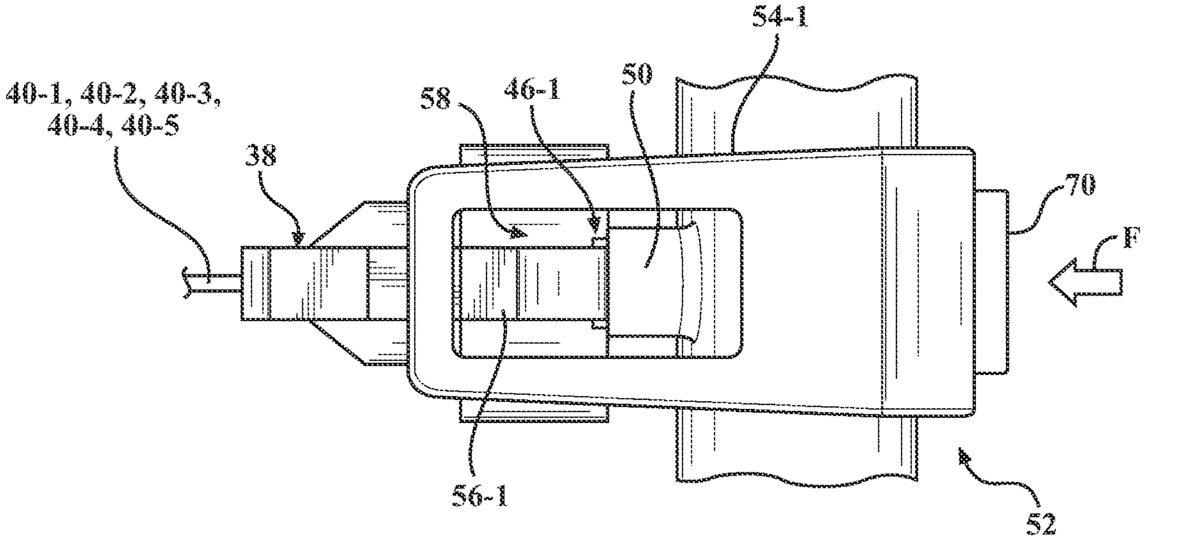
FIG. 5 is a schematic top view of the retention clip snapped onto the coolant header to secure the coolant manifolds to the coolant header.

As additionally shown in FIG. 4, the retention clip 52 may include a second snap-fit leg 54-2 configured to engage and lock onto one of the outlet fittings 46-1, 46-2, 46-3, 46-4, and 46-5. Specifically, the second snap-fit leg 54-1 would snap onto the outlet fitting corresponding to the same coolant passage as the respective inlet fitting. For example, the second snap-fit leg 54-2 would snap onto the outlet fitting 46-1 corresponding to the same coolant passage 40-1 as the inlet fitting 44-1 being engaged by the first snap-fit leg 54-1, thereby fixing each of the inlet and outlet manifolds 48, 50 to the coolant header 38. The retention clip 52 may be constructed from a polymeric material, such as Nylon PA66 or similar plastics.

As shown in FIG. 4, each of the inlet and outlet fittings, such as the fittings 44-1 and 44-2, may include a respective first tab 56-1 and second tab 56-2 projecting away from the corresponding fitting. As shown in FIGS. 4 and 5, each of the first and the second snap-fit legs 54-1, 54-2 may define an opening 58 configured to slidably engage and lock onto one of the first and second tabs 56-1 56-2 of the inlet and outlet fittings, such as the fittings 44-1 and 44-2. Each of the first and second tabs 56-1 56-2 may include a ramped surface 60 facing the respective first or second snap-fit leg 54-1, 54-2 to facilitate expansion of the respective snap-fit legs during their sliding engagement with the inlet and outlet fittings, e.g., fittings 44-1, 46-1, of the coolant header 38.

The retention clip 52 may also include a clip body 62 connected, in a single-piece or unitary fashion, to each of the first and second snap-fit legs 54-1, 54-2. In a side view shown in FIG. 4, the clip body 62 may be defined by a variable thickness $t_b$ and each of the first snap-fit leg 54-1 and the second snap-fit leg 54-1 has a thickness $t_1$ (which may also be variable). The thickness $t_1$ of each of the first and second snap-fit legs 54-1, 54-2 is intended to be smaller than the variable thickness $t_b$ of the clip body 62 such that majority of flex in the retention clip 52 during installation onto the inlet and outlet fittings, e.g., fittings 44-1 and 44-2, would occur in the snap-fit legs.

As may be seen in a cross-sectional view of the inlet and outlet manifolds 48, 50 (shown in FIG. 4), the inlet manifold and/or the outlet manifold may be defined by an outer surface 64 having a substantially circular shape. The clip body 62 may have an inner surface 66 having a first section 66-1 and/or a second section 66-2 characterized by a semi-circular, concave shape (shown in FIG. 4). The first section 66-1 and/or the second section 66-2 may be configured to engage and match the outer surface 64 of the respective inlet and/or outlet manifold 48, 50 when the retention clip 52 is snapped onto the coolant header 38. The clip body 62 also has an outer surface 68. The outer surface 68 may include one or more press-pads 70 (shown in FIGS. 4 and 5) configured to be engaged by an assembly device (not shown) exerting a force F (shown in FIG. 5) for snaping the retention clip 52 onto the coolant header 38. Each press-pad 70 may be arranged, in the side view of the retention clip 52, across from and generally centered on one of the concave-shaped sections 66-1, 66-2.

With reference to FIG. 4, the retention clip 52 may include an anti-rotation feature 72 configured to extend between the inlet manifold 48 and the outlet manifold 50. As depicted in FIG. 4, the anti-rotation feature 72 may project from the inner surface 66, such as between the first section 66-1 and the second section 66-2. Thus positioned, the anti-rotation feature 72 may be further configured to maintain separation between the respective inlet and outlet manifolds 48, 50. With resumed reference to FIG. 2, the cooling subsystem 36 may employ a number of retention clips 52 to secure the inlet and outlet manifolds 48, 50 to the coolant header 38. The number of retention clips 52 employed to clip the inlet and outlet manifolds 48, 50 onto the coolant header 38 may be selected based on the overall length of the subject manifolds and the number of cell rows and modules in the battery system 24. Overall, the retention clip 52 is configured to catch the inlet manifold 48 and the outlet manifold 50 and snap onto the coolant header 38, to thereby simultaneously fix and seal both, the inlet manifold and the outlet manifold, to the coolant header.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric energy generation and storage system comprising:

a plurality of battery cells arranged in rows; and a cooling subsystem configured to remove thermal energy from the battery cells and including:

a coolant header configured to extend proximately to and seat the battery cells, sandwich the rows of battery cells, and maintain position thereof, and having an inlet fitting and an outlet fitting;

an inlet manifold configured to connect with the inlet fitting and an outlet manifold configured to connect with the outlet fitting such that the inlet and outlet manifolds are together configured to circulate coolant through the coolant header; and a retention clip configured to engage and hold each of the inlet manifold and the outlet manifold and snap onto the coolant header to thereby fix the inlet manifold relative to the outlet manifold and fix and seal the inlet manifold and the outlet manifold to the coolant header.

2. The electric energy generation and storage system of claim 1, wherein the retention clip includes a first snap-fit leg and a second snap-fit leg and a clip body connected to each of the first and second snap-fit legs, and wherein the first snap-fit leg is configured to engage and lock onto the inlet fitting and the second snap-fit leg is configured to engage and lock onto the outlet fitting.

3. The electric energy generation and storage system of claim 2, wherein each of the inlet and outlet fittings includes a respective tab projecting away from the corresponding fitting, and wherein each of the first and the second snap-fit legs defines an opening configured to engage one tab of the inlet and outlet fittings.

4. The electric energy generation and storage system of claim 2, wherein at least one of the inlet manifold and the outlet manifold is defined by an outer surface having a circular shape in a cross-sectional view of the respective manifold, and wherein the clip body includes an inner surface having at least one section characterized by a concave shape, in a side view of the retention clip, configured to engage and match the outer surface of the at least one of the inlet manifold and outlet manifold when the retention clip is snapped onto the coolant header.

5. The electric energy generation and storage system of claim 4, wherein the clip body includes an outer surface having at least one press-pad configured to be engaged by an assembly device for snapping the retention clip onto the coolant header.

6. The electric energy generation and storage system of claim 5, wherein each press-pad is arranged, in the side view of the retention clip, across from one of the sections characterized by the concave shape.

7. The electric energy generation and storage system of claim 1, wherein the retention clip includes an anti-rotation feature configured to extend between the inlet manifold and the outlet manifold.

8. A cooling subsystem for removing thermal energy from an electric energy generation and storage system having a plurality of battery cells arranged in rows, the cooling subsystem comprising:

a coolant header configured to extend proximately to and seat the battery cells, sandwich the rows of battery cells, and maintain position thereof, and having an inlet fitting and an outlet fitting;

an inlet manifold configured to connect with the inlet fitting and an outlet manifold configured to connect with the outlet fitting such that the inlet and outlet manifolds are together configured to circulate coolant through the coolant header; and a retention clip configured to engage and hold each of the inlet manifold and the outlet manifold and snap onto the coolant header to thereby fix the inlet manifold relative to the outlet manifold and fix and seal the inlet manifold and the outlet manifold to the coolant header.

9. The cooling subsystem of claim 8, wherein the retention clip includes a first snap-fit leg and a second snap-fit leg and a clip body connected to each of the first and second snap-fit legs, and wherein the first snap-fit leg is configured to engage and lock onto the inlet fitting and the second snap-fit leg is configured to engage and lock onto the outlet fitting.

10. The cooling subsystem of claim 9, wherein each of the inlet and outlet fittings includes a respective tab projecting away from the corresponding fitting, and wherein each of the first and the second snap-fit legs defines an opening configured to engage one tab of the inlet and outlet fittings.

11. The cooling subsystem of claim 9, wherein at least one of the inlet manifold and the outlet manifold is defined by an outer surface having a circular shape in a cross-sectional view of the respective manifold, and wherein the clip body includes an inner surface having at least one section characterized by a concave shape, in a side view of the retention clip, configured to engage and match the outer surface of the at least one of the inlet manifold and outlet manifold when the retention clip is snapped onto the coolant header.

12. The cooling subsystem of claim 11, wherein the clip body includes an outer surface having at least one press-pad configured to be engaged by an assembly device for snapping the retention clip onto the coolant header.

13. The cooling subsystem of claim 12, wherein each press-pad is arranged, in the side view of the retention clip, across from one of the sections characterized by the concave shape.

14. The cooling subsystem of claim 8, wherein the retention clip includes an anti-rotation feature configured to extend between the inlet manifold and the outlet manifold.

* * * * *